US009146096B2

(12) United States Patent
Takahashi

(10) Patent No.: US 9,146,096 B2
(45) Date of Patent: Sep. 29, 2015

(54) FORM MEASURING APPARATUS, STRUCTURE MANUFACTURING SYSTEM, SCANNING APPARATUS, METHOD FOR MEASURING FORM, METHOD FOR MANUFACTURING STRUCTURE, AND NON-TRANSITORY COMPUTER READABLE MEDIUM STORING PROGRAM FOR MEASURING FORM

(71) Applicant: NIKON CORPORATION, Tokyo (JP)

(72) Inventor: Akira Takahashi, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 34 days.

(21) Appl. No.: 13/785,527

(22) Filed: Mar. 5, 2013

(65) Prior Publication Data

US 2013/0321823 A1 Dec. 5, 2013

Related U.S. Application Data

(60) Provisional application No. 61/616,643, filed on Mar. 28, 2012.

(30) Foreign Application Priority Data

Mar. 6, 2012 (JP) ................................ 2012-048975

(51) Int. Cl.
*G01B 11/24* (2006.01)
*G02B 26/10* (2006.01)
*G01B 11/25* (2006.01)

(52) U.S. Cl.
CPC ............ *G01B 11/24* (2013.01); *G01B 11/2513* (2013.01); *G02B 26/10* (2013.01)

(58) Field of Classification Search
CPC ....................................................... G01B 11/24
USPC ........................................................ 356/601
See application file for complete search history.

(56) References Cited

U.S. PATENT DOCUMENTS 5,446,549 A * 8/1995 Mazumder et al. ........... 356/613
5,848,188 A * 12/1998 Shibata et al. ................ 382/203

(Continued)

FOREIGN PATENT DOCUMENTS

| JP | 08-086622 | 4/1996 |
|----|-----------|--------|
| JP | 2004-191200 | 7/2004 |
| JP | 2009-204373 A | 9/2009 |

OTHER PUBLICATIONS

International Search Report from the Japanese Patent Office for corresponding International Application No. PCT/JP2013/056029, mailing date Apr. 16, 2013.

(Continued)

*Primary Examiner* — Roy M Punnoose
(74) *Attorney, Agent, or Firm* — Finnegan, Henderson, Farabow, Garrett & Dunner, LLP

(57) ABSTRACT

There is provided a form measuring apparatus including: a light generator configured to generate a light; a projector configured to scan the measuring object with the light by changing an irradiation direction of the light generated by the light generator; a controller configured to control the light generator to periodically change an intensity of the light generated by the light generator, and to change an amplitude of the intensity change of the generated light according to the irradiation direction; an imager configured to take an image of the measuring object; and a measuring portion configured to calculate the three-dimensional form of the measuring object based on the image of the measuring object.

44 Claims, 8 Drawing Sheets

(56) References Cited

U.S. PATENT DOCUMENTS

| | | | |
|---|---|---|---|
| 6,388,754 B1 * | 5/2002 | Nishikawa et al. | 356/601 |
| 6,674,893 B1 * | 1/2004 | Abe et al. | 382/154 |
| 6,703,634 B2 * | 3/2004 | Ono | 250/559.19 |
| 6,798,527 B2 * | 9/2004 | Fukumoto et al. | 356/602 |
| 7,098,435 B2 * | 8/2006 | Mueller et al. | 250/208.1 |
| 7,245,387 B2 * | 7/2007 | Mamiya et al. | 356/604 |
| 7,537,797 B2 * | 5/2009 | Nesbitt | 427/8 |
| 8,294,127 B2 * | 10/2012 | Tachibana | 250/492.3 |
| 8,723,923 B2 * | 5/2014 | Bloom et al. | 348/46 |
| 8,797,552 B2 * | 8/2014 | Suzuki et al. | 356/612 |
| 2003/0066949 A1 * | 4/2003 | Mueller et al. | 250/208.1 |
| 2012/0049091 A1 * | 3/2012 | Tachibana | 250/492.3 |
| 2012/0112096 A1 * | 5/2012 | Meyers et al. | 250/459.1 |
| 2013/0141734 A1 * | 6/2013 | Aoki | 356/601 |

OTHER PUBLICATIONS

International Preliminary Report on Patentability of International Application No. PCT/JP2013/056029, mailed Sep. 18, 2014.

* cited by examiner

200: STRUCTURAL OBJECT MANUFACTURING SYSTEM

FORM MEASURING APPARATUS, STRUCTURE MANUFACTURING SYSTEM, SCANNING APPARATUS, METHOD FOR MEASURING FORM, METHOD FOR MANUFACTURING STRUCTURE, AND NON-TRANSITORY COMPUTER READABLE MEDIUM STORING PROGRAM FOR MEASURING FORM

CROSS REFERENCE TO RELATED APPLICATIONS

The present patent application claims priority from Japanese Patent Application No. 2012-048975 filed on Mar. 6, 2012, and U.S. Provisional Patent Application No. 61/616,643 filed on Mar. 28, 2012, the disclosures of which are incorporated herein by reference in their entirety.

BACKGROUND

1. Field of the Invention

The present invention relates to a form measuring apparatus, a structure manufacturing system, a scanner, a form measuring method, a structure manufacturing method, and a computer-readable medium storing a form measuring program.

2. Description of the Related Art

There have been known form measuring apparatuses for three-dimensionally measuring shapes or forms of human bodies, artifacts such as industrial products, and the like (for example, see U.S. Pat. No. 5,848,188). Such a form measuring apparatus projects a grating pattern (to be also referred to as a structured light hereinafter) onto a measuring object, that is, an object to be measured; and measures a three-dimensional form of the measuring object by taking an image of the grating pattern projected on the measuring object. Further, in such a form measuring apparatus, a mirror (scanner), for example, is used to project the grating pattern.

SUMMARY

An aspect of the present teaching provides a form measuring apparatus configured to measure a three-dimensional form of a measuring object, including:

a light generator configured to generate a light;

a projector configured to scan the measuring object with the light by changing an irradiation direction of the light generated by the light generator;

a controller configured to control the light generator to periodically change an intensity of the light generated by the light generator, and to change an amplitude of the intensity change of the generated light according to the irradiation direction;

an imager configured to take an image of the measuring object; and a measuring portion configured to calculate the three-dimensional form of the measuring object based on the image of the measuring object.

DESCRIPTION OF THE EMBODIMENTS

Referring to the accompanying drawings, explanations will be given below about a form measuring apparatus in accordance with a first embodiment of the present teaching.

First Embodiment

Figure 1:
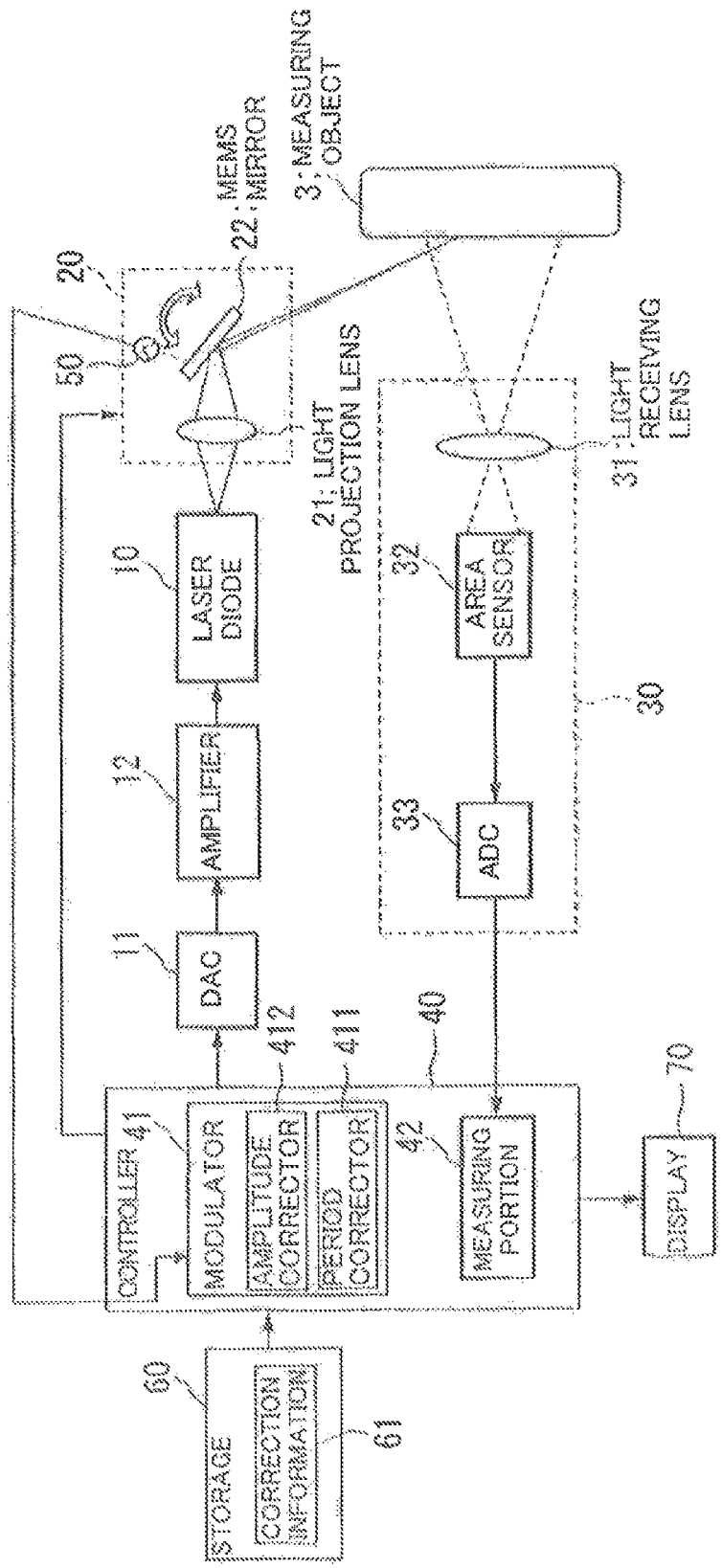
FIG. 1 is a block diagram showing a form measuring apparatus in accordance with a first embodiment.

FIG. 1 is a schematic block diagram showing a form measuring apparatus 1 in accordance with the first embodiment.

As shown in FIG. 1, the form measuring apparatus 1 includes a laser diode 10, a DAC (Digital to Analog Converter) 11, an amplifier 12, a projector 20, an imager 30, a controller 40, a storage 60, and a display 70.

The laser diode 10 is a light flux generator such as a visible light semiconductor laser diode or the like, for example, irradiating the projector 20 with light flux (laser light). Because a light intensity or a luminescence intensity of the laser diode 10 is determined according to the drive current to be injected, the intensity of the light flux generated by the laser diode 10 changes with drive current signals supplied from the amplifier 12. Therefore, when periodically changing drive current signals are inputted from the amplifier 12, then in response to that, laser light emitted from the laser diode 10 is periodically changed in intensity.

The projector 20 shapes the light flux radiated from the laser diode 10 into such light flux as having a predetermined intensity distribution, and then sequentially projects the light flux from the laser diode 10 onto the entire measuring area of a measuring object 3 by deflecting the irradiation direction of that light flux toward the measuring object 3. The projector 20 includes a light projection lens 21 and a MEMS mirror (Micro Electro Mechanical Systems) 22. While the light projection lens 21 in FIG. 1 is shown as a single lens for simplification, the light projection lens 21 actually includes lenses such as a cylindrical lens, condensing lens and the like for shaping the light flux into the predetermined intensity distribution. The MEMS mirror 22 includes a reflector and a hinge to retain the reflector. This hinge is provided in a vertical direction to the reflector on the sheet surface of FIG. 1. Then, it is caused to move reciprocatingly in a direction shown by the arrow mark in FIG. 1. The MEMS mirror 22 applies a force to this hinge in a torsional direction thereof to cause the reflector to undergo a repetitive rotary movement in a state of mechanical resonance, thereby projecting the light flux from the laser diode 10 onto the entire measuring area of the measuring object 3. Since the MEMS mirror 22 is caused to repetitively undergo a torsional movement, a facing direction to which the reflector faces changes periodically because of the simple harmonic motion. The projector 20 irradiates the measuring object 3 with the light flux from the laser diode 20, being deflected by the MEMS mirror 22. Then the light flux is irradiated from a different direction with the direction in which the imager 30 takes an image such that the light flux from the laser diode 10 is projected onto the measuring area of the measuring object 3, while the imager 30 is exposed so as to image the measuring object 3.

Further, the projector 20 has the light projection lens 21 which includes a cylindrical lens and the like to shape the intensity distribution such that the laser light radiated from the laser diode 10 has a linear light intensity distribution in such one direction as vertical to the optical axis direction of the laser light. The projector 20 can let the MEMS mirror 22 change in reflecting direction to form a bright-dark distribution of brightness on the surface of the measuring object 3 within a predetermined time at the same pitch while periodically changing the intensity of the light. Therefore, with the MEMS mirror 22 displaced by half the period of the simple harmonic motion, the projector 20 projects, onto the measuring object 3, a stripe pattern (sinusoidal grating) which changes sinusoidally in brightness toward the measuring object 3.

Further, the projector 20 includes the light projection lens 21, the MEMS mirror 22, and an angle detector 50.

The light projection lens 21 includes condensing lenses 233 and 213, and a cylindrical lens 24 as described below, and is arranged between the laser diode 10 and the MEMS mirror 22.

The MEMS mirror 22 (deflector) causes the hinge to undergo a torsional motion based on a control signal, supplied from the controller 40. The MEMS mirror 22 reflects the light emitted from the light projection lens 21, and projects the reflected light onto the measuring object 3. The MEMS mirror 22 is a reflecting member of simple harmonic motion type which is configured to change the irradiation direction of the light flux with a constant period. Here, the light to be reflected by the MEMS mirror 22 is an approximately rectangular shaped pattern light (hereinafter, also referred to a linear light) which has passed through the cylindrical lens 24. The MEMS mirror 22 can scan the whole of an approximately square area via scanning over the measuring object 3 with the rectangular shaped pattern light in the latitudinal direction thereof by letting the central axis of oscillation be a longitudinal direction of an approximate rectangle.

The angle detector 50 is, for example, a sensor such as an eddy current sensor, capacitance sensor or the like, and detects the facing angle of the reflecting surface of the MEMS mirror 22, or the phase of the oscillation period. The angle detector 50 supplies the controller 40 with the detected direction of the reflecting surface of the MEMS mirror 22. Further, the angle detector 50 can also use a simple proximity switch such as a photo interrupter or the like, for example, which does not output the facing angle of the reflecting surface but outputs the phase of oscillation (for example, the timing information which indicates that the light direction is a predetermined direction). Especially, the MEMS mirror 22 lets its reflecting surface undergo a periodical, change always with a constant frequency and amplitude (the maximum deflection range of the reflecting surface displacement), by repetitively displacing the reflecting surface with the resonance frequency of the structure retaining the reflecting surface. Therefore, it is possible to calculate in what direction the reflecting surface is facing by detecting the phase in this oscillation state. Further, when the oscillation period of the MEMS mirror 22 is known, then the controller 40 can detect the change of the light direction in association with the elapsed time from this timing information, based on the information denoting the timing indicating that the reflecting surface is in a specified direction. Here, explanations will be made in regarding the angular information as including such information as, for example, angle (phase), angular velocity, the above phase of oscillation, and the like.

The imager 30 generates an image of the measuring object 3 by way of imaging the measuring object 3. The imager 30 can acquire an integrated light amount distribution acquired in one frame. Therefore, the image acquired by the imager 30 can be taken as an image of having projected the stripe pattern on the measuring object 3 by sinusoidally changing the amount of the light flux emitted from the laser diode 10 along with the time while deflecting the laser light with the MEMS mirror 22. Therefore, in the first embodiment, the imager 30 carries out the exposure operation in cooperation with the projector 20. Especially, the imager 30 carries out the exposure process in synchronization with the oscillation phase of the reflector of the MEMS mirror 22 (the reflector) of the projector 20. The imager 30 sends the generated image to the controller 40. Then, the controller 40 stores the image data of the image into the storage 60. In the first embodiment, the imager 30 generates a plurality of images by way of taking an image of the measuring object 3 on which the projector 20 has projected a plurality of grating patterns different in initial phase, according to each initial phase based on N-bucket method.

Further, the imager 30 includes a light receiving lens 31, an area sensor 32, and an ADC (Analog to Digital Converter) 33.

The light receiving lens 31 is a light receiving optical system (imaging optical system) which causes the area sensor 32 to form an image of the stripe pattern projected on the surface of the measuring object 3.

The area sensor 32 (imaging element) is a light receiving element which receives the image formed by the light receiving lens 31, and converts the image into an electric signal (analog signal). The area sensor 32 is a two-dimensional image sensor such as, for example, a two-dimensional-type CCD (Charge Coupled Device) image sensor, two-dimensional-type MOS (Metal Oxide Semiconductor) image sensor, or the like. The area sensor 32 converts the image of the grating pattern formed by the light receiving lens 31 into an analog signal, and supplies the analog signal to the ADC 33.

The ADC 33 converts the analog signal into a digital signal, and supplies the controller 40 with the converted digital signal, i.e. the image data.

The storage 60 stores a variety of information for the form measuring apparatus 1. The storage 60 stores, for example, the image data obtained by the imager 30 via imaging, various kinds of setting information for measuring, aftermentioned correction information 61 of a drive signal when controlling the laser diode 10 to drive, etc. The storage 60 stores precalculated correction information in association with the directional change of the light (for example, the angular information). Here, the correction information is correction table information such as, for example, a lookup table or the like.

The display 70 is a display exhibiting various kinds of information. For example, the display 70 exhibits point group data and the like indicating a three-dimensional form of the measuring object 3 obtained through calculation by an aftermentioned measuring portion 42.

The controller 40 carries out control of a process to measure the form of the measuring object 3 for the form measuring apparatus 1, and a calculation process to obtain a three-dimensional form of the measuring object 3. In particular, the controller 40 controls the drive current supplied to the laser diode 10 to synchronize with the oscillation state of the MEMS mirror 22 so as to generate a periodical intensity change in the laser light emitted from the laser diode 10. The controller 40 also controls the imager 30 to take an image of the aforementioned grating pattern or the stripe pattern within an imaging time. Further, the controller 40 calculates three-dimensional coordinates of the measuring object 3 and outputs the form measurement value of the measuring object 3, based on the image taken by the imager 30. Then, the controller 40 controls the display 70 to display the measured form of the measuring object 3.

Further, the controller 40 includes a modulator 41 and the measuring portion 42.

The modulator 41 applies modulation to the periodical change of the light-emitting intensity of the laser light radiated by the laser diode 10. On this occasion, the modulator 41 carries out the modulation set according to the facing of the reflecting surface of the MEMS mirror 22. By virtue of this, the light-emitting intensity of the laser light changes periodically according to the facing of the reflecting surface of the MEMS mirror 22.

Next, a detailed explanation will be given about the modulation carried out by the modulator 41. If the measuring object 3 is a flat surface, then the modulator 41 controls the change of the light-emitting intensity of the laser light according to the reflecting direction of the MEMS mirror 22 such that the imager 30 takes an image of the equal-interval grating pattern (stripe pattern). In this instance, the modulator 41 corrects the drive signal having a periodical waveform supplied to the laser diode 10 according to the direction of the reflecting surface of the MEMS mirror 22, so that in whatever portion of the measuring area of the measuring object 3, the difference in brightness between bright part and dark part is the same. The modulator 41 corrects the drive signal having a periodical waveform supplied to the laser diode 10 according to the direction of the reflecting surface of the MEMS mirror 22, so that in whatever portion being compared, the spacing distance or the interval between bright part and dark part is the same. The modulator 41 alters the period of the light-emitting intensity change of the laser light according to the facing of the reflecting surface of the MEMS mirror 22 (a first method). In particular, the modulator 41 corrects the period of the intensity change of the laser light according to the deflection direction of the laser light. By virtue of this, when the measuring object 3 is a flat surface, the grating pattern (stripe pattern) has equal intervals.

Further, the modulator 41 alters the amplitude of the intensity change of the laser light intensity according to the directional change of the laser light (a second method). In particular, the modulator 41 alters the amplitude of modulating the laser light intensity according to the direction of the reflecting surface of the MEMS mirror 22. Specifically, the modulator 41 alters the amplitude of modulating the laser light intensity such that in any area of the grating pattern projected on a flat surface parallel to a conjugate plane to the light-receiving plane of the area sensor 32 of the imager 30, the light intensity difference becomes almost the same between bright part and dark part.

Further, descriptions will be made later with respect to the details of correcting the intensity modulation of the laser light by way of the above two methods.

Via the DAC 11, the modulator 41 supplies to the laser diode 10 the drive current which sinusoidally changes depending on time. In this instance, the modulator 41 corrects or alters the signal of a reference period to become different in period and intensity according to the oscillation phase of the MEMS mirror 22. The above correction of modulation is carried out by way of the two methods. For example, the modulator 41 acquires the timing information indicating a position of the maximum deflection angle supplied from the angle detector 50, and carries out the above correction of modulation according to each elapsed time from this timing information.

Further, the modulator 41 includes a period corrector 411 and an amplitude corrector 412.

The period corrector 411 is a corrector which carries out the correction of modulation by the aforementioned first method, for example, carries out correction of changing the period of a sinusoidal signal with a single frequency as the reference, according to the laser light, direction. The sinusoidal signal corrected by the period corrector 411 is input to the laser diode 10 via the DAC 11 and amplifier 12. Therefore, If the measuring surface is flat, the imager 30 can acquire an image of an equal-interval pattern. The period corrector 411 supplies the amplitude corrector 412 with the corrected sinusoidal signal data as a modulation signal with corrected period. The period corrector 411 can also carry out the correction based on, for example, a sinusoidal signal with different frequency and amplitude (a reference modulation signal) according to the measuring mode.

Further, it is not necessary to sequentially monitor the angle of the reflecting surface of the MEMS mirror 22 and, in the first embodiment, the period corrector 411 can also generate the signal with such a timing that the reflecting surface of the MEMS mirror 22 forms a predetermined deflection angle from the angle detector 50 (for example, the maximum deflection angle). In such case, a similar effect can be acquired by adjusting the timing of altering the period of the sinusoidal signal to the timing of detecting the signal. Further, with respect to the MEMS mirror 22 of the projector 20, because the light deflection direction changes due to the simple harmonic motion, the angular change (angular velocity) detected by the angle detector 50 is fast in the central portion (central area) but slow in the surrounding portion (surrounding area) within the range of directional change of the laser light. Therefore, the period corrector 411 alters the modulation period so as to lengthen the modulation period of the drive current supplied to the laser diode 10, when the facing of the reflecting surface of the MEMS mirror 22 is such a facing as to project the light flux of the laser diode 10 onto the surrounding area rather than the central area of the measuring area. In the first embodiment, for example, the period corrector 411 alters the referential period of the sinusoidal signal according to the aforementioned timing information supplied from the angle detector 50 such that the grating (striping) in the grating pattern (stripe pattern) has equal intervals.

Further, the period corrector 411 alters the modulation period according to the optical properties of the imaging optical system (for example, the focal distance of the light receiving lens 31, the optical conditions such as the distortion and the like in the light receiving lens 31). For example, the period corrector 411 lengthens the referential period of the sinusoidal signal in the surrounding area rather than the central area such that the light receiving lens 31 can secure the resolution power for measurement.

The amplitude corrector 412 is another corrector which carries out modulation alteration by the aforementioned second method, for example, alters the intensity of the light flux emitted from the laser diode 10 according to the direction of the reflecting surface of the MEMS mirror 22. When the intensity of the light flux emitted from the laser diode 10 is constant, then because of the different distance from the irradiation position of the measuring object 3 projected by the MEMS mirror 22 to the MEMS mirror 22, no constant difference is available in the bright-dark intensity of the grating pattern in the image obtained by the imager 30. Hence, for example, the amplitude corrector 412 corrects the amplitude of the modulation signal of which period has been corrected, according to the angular information of the reflecting surface of the MEMS mirror 22 so as to equalize the intensity amplitude of the grating in the grating pattern.

Further, the amplitude corrector 412 alters the amplitude of the modulation signal of which period has been corrected such that the grating intensity distribution in the grating pattern is within the scope of the level at which the area sensor 32 is capable of imaging, based on the noise level and saturation level of the area sensor 32 included in the imager 30. Therefore, the laser diode 10 is configured to emit an amount of light at the noise level or higher even for the dark part. That is, the amplitude corrector 412 alters the amplitude of the light amount change of the light flux according to the optical conditions of the imaging optical system.

The amplitude corrector 412 supplies the DAC portion 11 with the modulation signal (digital signal) for which correction is carried out as altering the amplitude of the modulation signal of which period has been corrected, by the aforementioned second method.

In this manner, in the present teaching, the degree of the light flux intensity from the laser diode 10 is altered by means of the amplitude correction, period correction and the like. Thereby, a number of problems arising from projection of the stripe pattern in the scanning of the laser light flux can be solved.

The measuring portion 42 calculates the three-dimensional coordinates of the measuring object 3 to measure the form of the measuring object 3 based on the image taken by the imager 30. The measuring portion 42 reads out the image data obtained by the imager 30 and stored in the storage 60, and measures the form of the measuring object 3 based on the image data read out. For example, the measuring portion 42 takes images of a plurality of grating patterns (e.g. four grating patterns) which are different in initial phase based on the N-bucket method and projected on the measuring object 3, and carries out form measurement of the measuring object 3 based on the brightness value of an identical pixel in each of the images. That is, the measuring portion 42 measures the form of the measuring object 3 based on a plurality of (e.g. four) images taken by the imager 30 in respective correspondence with a plurality of grating patterns (e.g. four grating patterns) different in phase.

Further, the controller 40 causes the display 70 to display the form of the measuring object 3 measured by the measuring portion 42.

The DAC 11 is, for example, a digital-analog converter which converts a digital signal into an analog signal. The DAC 11 converts the corrected modulation signal (a digital signal) supplied from the modulator 41 into an analog voltage signal, and supplies the converted analog voltage signal to the amplifier 12.

The amplifier 12 is, for example, a voltage-current conversion amplifier (V/I amplifier) which converts a voltage signal into a current signal. The amplifier 12 converts, into a current signal, the analog voltage signal of the corrected modulation signal supplied from the DAC 11, and supplies the laser diode 10 with the analog current signal of the corrected modulation signal. That is, the amplifier 12 outputs an injection current to the laser diode 10. By virtue of this, the laser diode 10 emits the laser light of which light intensity has been modulated.

Next, explanations will be given about the operation of the form measuring apparatus 1 in the first embodiment.

Figure 2:
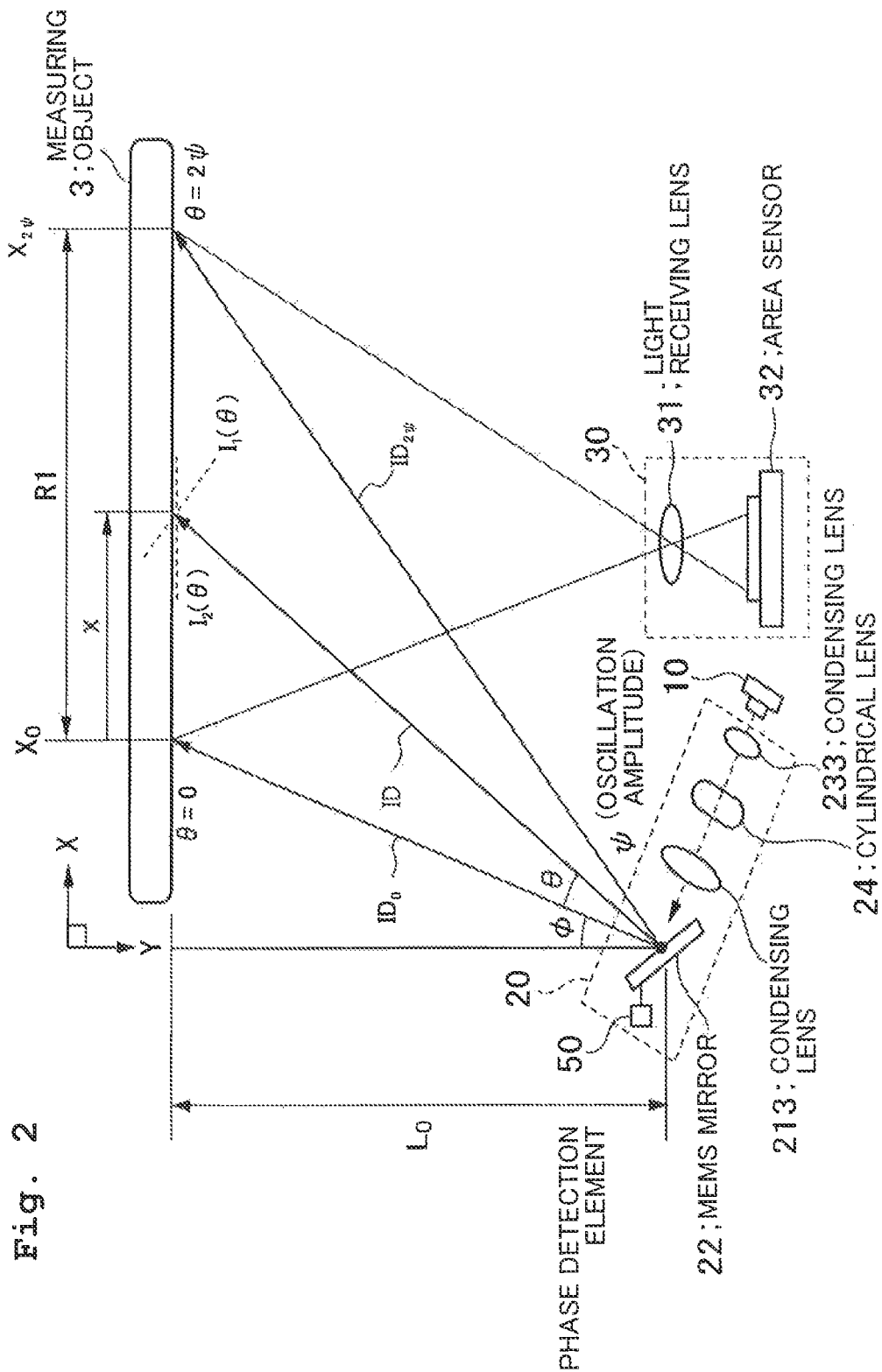
FIG. 2 shows a model of a MEMS mirror projecting light onto a measuring object in accordance with the first embodiment.

FIG. 2 shows a model of the MEMS mirror 22 projecting the light onto the measuring object 3 in accordance with the first embodiment.

In FIG. 2, the same reference numerals are used to refer to the same components as those in FIG. 1 in terms of configuration, any explanation for which will be omitted. Further, instead of the light projection lens 21 of FIG. 1, the condensing lens 233, cylindrical lens 24, and condensing lens 213 are used in FIG. 2 to shape the light flux from the laser diode 10 so as to form a linear intensity distribution. The projector 20 lets the condensing lens 233 adjust the laser light radiated from the laser diode 10 to become parallel, light and, moreover, to pass through the cylindrical lens 24 and condensing lens 213 to be formed into a beam of linear laser light (linear light).

Further, in FIG. 2, "0" represents an arbitrary value on the left side (the left in the X-axis direction) of the deflection angle θ of the laser light reflected by the MEMS mirror 22, while "$2\psi$" represents an arbitrary value (here, it is the maximum value by which the laser light can be deflected) on the right side (the right in the X-axis direction). Further, time t represents any time within the time period from the time t=0 (the laser light is deflected to the leftmost position $X_0$) to the time t=π (the laser light is deflected to the rightmost position $X_{2\psi}$). Further, here, the measuring object 3 is supposed to be a substance having a uniformly flat surface, and the coordinate x on the measuring object 3 takes the position $X_0$ as its origin at which the laser light (linear light) is directed when the time t=0. Further, range R1 represents the scanning range (measuring range) of the laser light (linear light) on the measuring object 3, corresponding to the directional change range of the laser light.

Further, here, the X-axis direction represents the direction in which scanning is carried out with the laser light (linear light) over the measuring object 3 (the direction changes with the oscillation), while the Y-axis direction represents the imaging direction of the imager 30, perpendicular to the X axis.

Further, on the plane defined by the X axis and Y axis (a plane parallel to the page of FIG. 2), a light irradiation direction ID is defined to be the direction in which the linear laser light reflected from the MEMS mirror 22 is incident on the measuring object 3. That is, as the deflection angle θ of the laser light reflected by the MEMS mirror 22 changes with time, the irradiation direction ID also changes. In particular, when the deflection angle θ of the laser light is 0, the light irradiation direction is $ID_0$, while when the deflection angle θ of the laser light is $2\psi$, the light irradiation direction is $ID_{2\psi}$. Here, it is possible to rephrase the deflection angle θ of the laser light reflected from the MEMS mirror 22 as the irradiation direction ID of the laser light based on the light irradiation direction $ID_0$ when the deflection angle θ is 0.

First, an explanation will be given about the principle and operation of the period corrector 411 in the form measuring apparatus 1 (the alteration process of modulation by the first method).

The following Formula 1 expresses the deflection angle θ of the laser light oscillated by the MEMS mirror 22 (i.e. the irradiation direction of the laser light), as a function of the time t.

<Formula 1>

$$\theta(t) = \Psi \cdot (1 - \cos t) \quad (1)$$

However, in Formula 1, the time t is $0 \leq t \leq \pi$. Further, here, the variable ψ corresponds to the amplitude whereby the MEMS mirror 22 deflects the laser light (linear light).

Because the facing of the reflecting surface of the MEMS mirror 22 sinusoidally changes with the passage of time, as shown in Formula 1, the deflection angle θ of the laser light (the irradiation direction ID of the laser light) also sinusoidally changes. The displacement of the coordinate x on the measuring object 3 is in disproportionate relation with the time t.

Further, when the coordinate x on the measuring object 3 is denoted as a function of the deflection angle θ of the laser light (linear light), i.e. the irradiation direction ID of the laser light, then it is expressed by the following Formula 2.

<Formula 2>

$$x(\theta) = L_0\{\tan(\theta+\phi) - \tan\phi\} \quad (2)$$

However, angle φ is the angle among the deflection angles of the laser light (linear light) when the MEMS mirror 22 is deflected maximally in one direction. For example, referring to FIG. 2, it is the angle when the irradiation direction of the laser light is the leftmost direction (Y-axis direction). Further, distance $L_0$ denotes the distance from the MEMS mirror 22 to the measuring object 3 in the direction (Y-axis direction) perpendicular to the X-axis direction of the coordinate x.

As shown by Formula 2, the distance x (coordinate x) from the origin position within the measuring range R1 in the form measuring apparatus 1, corresponding to the imaging range of the imager 30, (for example, the position $X_0$ at which the measuring object 3 is irradiated with the laser light when the irradiation direction of the laser light is the leftmost irradiation direction), is not proportional to the irradiation direction ID of the laser light.

Combining the above Formula 1 and Formula 2, the following Formula 3 expresses the distance x as a function of the time t.

<Formula 3>

$$x(t) = L_0[\tan\{\psi \cdot (1-\cos t) + \phi\} - \tan\phi] \quad (3)$$

In this manner, as shown in Formula 3, the coordinate x of irradiation with the laser light (linear light) over the measuring object 3 is not proportional to the time t. Therefore, when a sinusoidal signal with a constant period is used as it is as the modulation signal of the laser intensity independent of the irradiation direction of the laser light as with an aftermentioned waveform W1 shown in FIG. 3 without carrying out correction with the period corrector 411, then the area sensor 32 cannot take any image of a pattern having uniform grating intervals (stripe intervals) with respect to the coordinate x for the grating pattern or the stripe pattern. In the first embodiment, therefore, the period corrector 411 carries out correction of the modulation signal by use of a function which substitutes the above Formula 3 for the variable x of the function f(x) denoting the intensity of the stripe pattern to be projected. For example, when it is desired to project, onto the measuring object 3, a uniformly sinusoidal stripe pattern: f(x)=sin(x), then the function used to carry out correction of the modulation signal period is a function f(t) of the time t as expressed by the following Formula 4.

<Formula 4>

$$f(t) = \sin\left(L_0[\tan\{\psi \cdot (1-\cos t) + \phi\} - \tan\phi]\right) \quad (4)$$

For example, when correcting the modulation period based on Formula 4, the period corrector 411 acquires the timing information at the origin position $X_0$ within the measuring range R1 based on the angular information detected by the angle detector 50. The period corrector 411 generates the corrected modulation signal by applying the above Formula 4 as a function of the time t (elapsed time) with reference (t=0) to the timing at the origin position $X_0$. In particular, letting t=0 be the timing whereby the direction of the reflecting surface of the MEMS mirror 22 is a predetermined direction, the period corrector 411 equalizes the grating intervals (stripe intervals) of the grating pattern by outputting the sinusoidal modulation signal of which period changes with the passage of time with such a period as shown in Formula 4 in synchronization with the timing.

Further, for example, the corrected modulation signal is, precalculated based on Formula 4 and stored in the storage 60 as the correction information 61 associated with the time t (lookup table or correction table). The period corrector 411 carries out correction of the period of the modulation signal based on the correction information 61 (lookup table or correction table) stored in the storage 60.

Further, by Formula 4, the explanation was made with an aspect of carrying out correction of the period of the modulation signal based on the function f(t) of the time t. However, it is also possible to carry out correction to the modulation signal of the laser light intensity based on a function f(θ) of the irradiation angle θ of the laser light (light direction). Especially, this is useful to a configuration of constantly monitoring the direction of the reflecting surface such as with a polygon mirror. In this case, in analogy with Formula 4, by applying f(x)=sin(x) to Formula 2, the period corrector 411 can carry out correction of the period of the modulation signal in the same manner as by Formula 4. Further, in this case, the period corrector 411 carries out correction of the period of the modulation signal based on the function f(θ) as the angular information (angle (phase), for example) of the reflecting surface of the MEMS mirror 22 outputted from the angle detector 50.

Further, as shown in FIG. 2, $X_{2\psi}$ has a longer distance than $X_0$ from the MEMS mirror 22 to the irradiation position. Even though the angular change is the same, when the distance is longer, then the amount of change in irradiation position becomes larger. Hence, as the distance from the MEMS mirror 22 to the irradiation position becomes longer, it is preferable to shorten the period. The length of the period may also be changed, with the distance as a parameter in this manner. In the first embodiment, it is configured to lengthen the light-emitting period of the laser diode 10 in proportion to the distance between the projector and the irradiation position.

Next, an explanation will be given about the principle and operation of the amplitude corrector 412 in the form measuring apparatus 1 (modulation alteration process by the second method).

When the distance L from the MEMS mirror 22 to the position of projecting the laser light (linear light) on the measuring object 3 is denoted in terms of a light angle θ (light direction), then it is expressed by the following Formula 5.

⟨Formula 5⟩

$$L(\theta) = \frac{L_0}{\cos(\theta + \phi)} \quad (5)$$

Herein, the distance $L_0$ denotes the distance from the MEMS mirror 22 to the measuring object 3 in the imaging direction (Y-axis direction) of the imager 30, perpendicular to the X-axis direction of the coordinate x. Further, the irradiation angle θ of the laser light is 0≤θ≤2ψ.

As one example, because the laser light intensity is inversely proportional to the square of the distance $L_0$ from the MEMS mirror 22, when $I_0$ represents the laser light intensity on the reflecting surface of the MEMS mirror 22, then the following Formula 6 expresses the laser light intensity $I_1(\theta)$ on the plane vertical to the propagation direction of the laser light on the surface of the measuring object 3.

⟨Formula 6⟩

$$I_1(\theta) = \frac{\cos^2(\theta + \phi)}{L_0^2} I_0 \quad (6)$$

As shown in Formula 6, the distance L from the MEMS mirror 22 differs as the irradiation position of the light flux onto the measuring object 3 changes. Therefore, the intensity of the radiated laser light differs along with the position on the measuring object 3.

Further, when the deflection angle of the laser light (linear light) is angle $\theta$, then the incidence angle of irradiating the light onto the measuring object 3 is $\theta+\phi$, therefore, the laser light intensity $I_2(\theta)$ on the measuring object 3 is expressed by the following Formula 7.

<Formula 7>

$$I_2(\theta) = \cos(\theta + \phi) I_1(\theta) \quad (7)$$

As shown in Formula 7, the angle of irradiating the laser light onto the measuring object 3 differs as the position on the measuring object 3 changes.

Here, the laser light intensity $I_2(\theta)$ on the measuring object 3 in which Formula 7 is taken into consideration is expressed by the Formula 8, by substituting Formula 6 into the above Formula 7.

⟨Formula 8⟩

$$I_2(\theta) = \frac{\cos^3(\theta + \phi)}{L_0^2} I_0 \quad (8)$$

Here, the following Formula 9 expresses the ratio of the laser light intensities based on the angle ($\theta=2\psi$) at the minimum laser light intensity on the measuring object 3 within the measuring range R1.

⟨Formula 9⟩

$$\frac{I_2(\theta)}{I_2(\theta_{max} + \phi)} = \frac{\cos^3(\theta + \phi)}{\cos^3(2\psi + \phi)} \quad (9)$$

Here, however, the maximum deflection angle $\theta_{max}$ of the laser light is $2\psi$.

In order for the measuring object 3 to be irradiated with a constant intensity at any measuring position of the measuring object 3 independent of the laser light angle $\theta$, the laser light intensity can be controlled based on the reciprocal of the above Formula 9. Therefore, the following Formula 10 expresses a correction function $P(\theta)$ of the amplitude having taken the reciprocal of Formula 9.

⟨Formula 10⟩

$$P(\theta) = \frac{\cos^3(2\psi + \phi)}{\cos^3(\theta + \phi)} \quad (10)$$

Further, when the above Formula 10 is expressed by a function of the time t, then it is expressed by the following Formula 11.

⟨Formula 11⟩

$$P(t) = \frac{\cos^3(2\psi + \phi)}{\cos^3\{\psi \cdot (1 - \cos t) + \phi\}} \quad (11)$$

Based on Formula 11, when correcting the modulation amplitude, for example, the amplitude corrector 412 lets the angle detector 50 acquire the timing when the reflecting surface of the MEMS mirror 22 forms such an angle that the laser light is radiated at the origin position $X_0$ of the measuring range R1. The amplitude corrector 412 generates the modulation signal according to the above Formula 11 based on this timing (t=0). The amplitude corrector 412 carries out correction of the amplitude based on Formula 11 to the modulation signal whose period has been corrected by the period corrector 411. In particular, the amplitude corrector 412 multiplies the correction function P(t) of Formula 11 by the modulation signal of which period has been corrected by the period corrector 411. By virtue of this, the signal intensity of the grating pattern (stripe pattern) is equalized.

Further, the storage 60 stores the value of the correction function P(t) as the correction information 61 associated with the time t (lookup table or correction table). The amplitude corrector 412 carries out correction of the amplitude of the modulation signal based on the correction information 61 (lookup table or correction table) stored in the storage 60.

Further, by Formula 11, the explanation was made with an aspect of carrying out correction of the amplitude of the modulation signal based on the function f(t) of the time t. However, it is also possible to carry out correction of the amplitude of the modulation signal based on the correction function f($\theta$) of the light angle $\theta$ (light direction). In this case, by applying Formula 10 instead of Formula 11, the amplitude corrector 412 can carry out correction of the amplitude of the modulation signal in the same manner as by Formula 11. Further, in this case, the amplitude corrector 412 carries out correction of the amplitude of the modulation signal based on the correction function P($\theta$) as the angular information (angle (phase), for example) wherein the change in light direction is detected by the angle detector 50.

Further, in the above example, the explanation was made with an aspect of carrying out the correction under a condition that the laser light intensity decreases in inverse proportion to the square of the distance $L_0$. However, the method of the present teaching is not limited to this condition. For example, when the laser light intensity is kept almost constant independent of the distance $L_0$, or when the laser light intensity is denoted by an arbitrary function g ($L_0$) of the distance $L_0$, then it is possible to carry out correction of the laser light intensity by the method of the present teaching.

In this manner, based on the direction (angular information) of the reflecting surface of the MEMS mirror 22, the modulator 41 carries out a process of altering the period of the intensity change of the laser light according to the angle of the reflecting surface of the MEMS mirror 22, as well as altering the amplitude of the intensity change of the laser light according to the angle of the reflecting surface of the MEMS mirror 22. The modulator 41 supplies the DAC 11 with the generated and corrected modulation signal. The DAC 11 converts the corrected modulation signal (digital signal) supplied from the modulator 41 into an analog voltage signal, and supplies the amplifier 12 with the converted analog voltage signal. The amplifier 12 converts, into a current signal, the analog voltage signal of the corrected modulation signal supplied from the DAC 11, and supplies the laser diode 10 with the analog current signal of the corrected modulation signal. That is, the amplifier 12 outputs an injection current to the laser diode 10. By virtue of this, the laser diode 10 emits the laser light of which light intensity has been modulated.

Figure 3:
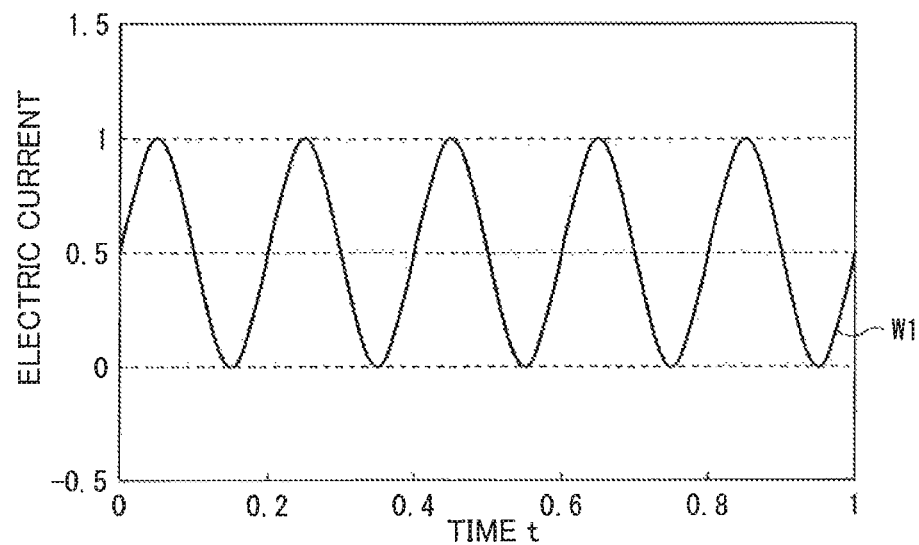
FIG. 3 shows a modulation signal before correction by a conventional modulator.

Further, such a modulation signal as with the waveform W1 shown in FIG. 3, for example, is outputted from a conventional modulator which does not carry out the correction process (alteration of modulation) as described above.

FIG. 3 shows intensity change of a modulation signal with time before correction by a conventional modulator. In FIG. 3, the horizontal axis represents time t, while the vertical axis represents injection current corresponding to laser light intensity. Further, for simplification, explanations will be made with a case of zeroing the intensity of the darkest part in an image of the stripe pattern obtained by the imager 30.

The waveform W1 is the waveform of a modulation signal which sinusoidally changes the laser light intensity with a constant period and constant amplitude.

Figure 4:
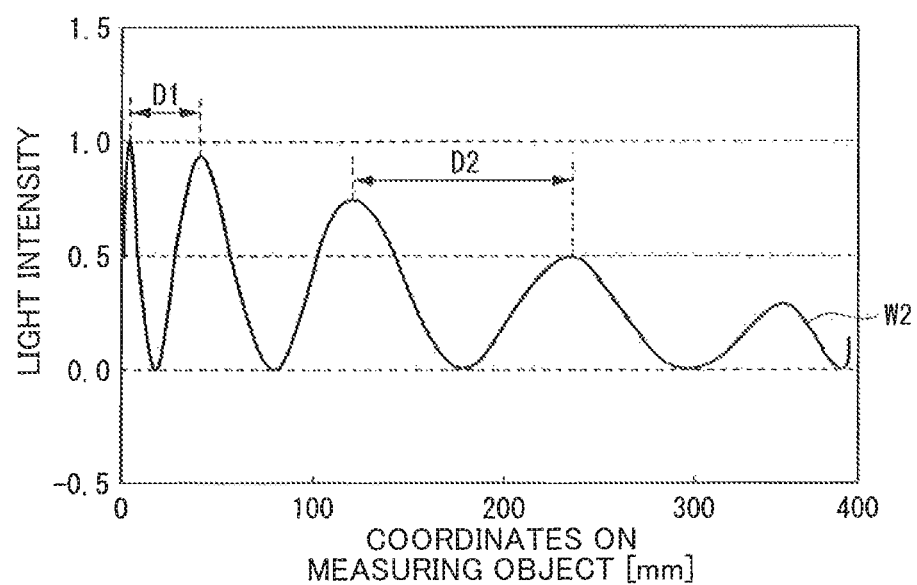
FIG. 4 shows an intensity distribution of light when such correction is not carried out as by a modulator in accordance with the first embodiment.

Considering the case in which the modulation signal, as it is, such as that shown by the waveform W1 is used, the intensity distribution of the laser light has such a form as a waveform W2 shown in FIG. 4. This is because the displacement of the coordinate x on the measuring object 3 is in disproportionate relation with the time t, as shown in FIG. 2 as described hereinbefore The horizontal axis of FIG. 4 represents the coordinate x in FIG. 2, while the vertical axis represents the light intensity. This light intensity distribution corresponds to the bright-dark grating (striping) of the grating pattern (stripe pattern). In the waveform W2, the interval D2 of the bright-dark grating (striping) in the central area is longer than the interval D1 in the surrounding area, thereby not forming a constant interval of the bright-dark grating (striping).

Figure 5:
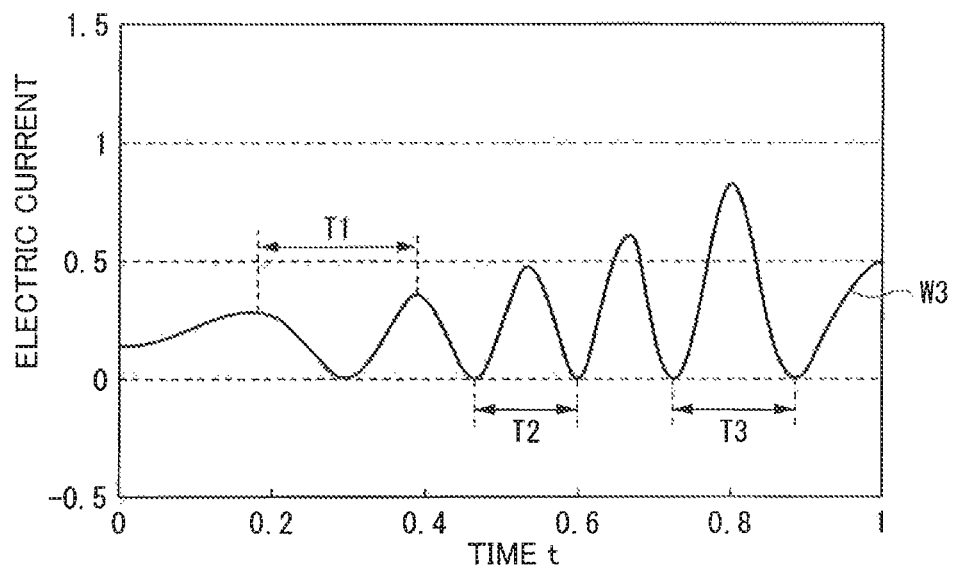
FIG. 5 shows a modulation signal corrected by the modulator in accordance with the first embodiment.

In contrast to this, the modulator 41 in the first embodiment carries out a correction to alter the period and amplitude of modulation by the aforementioned two methods, and generates such a corrected modulation signal as with a waveform W3 shown in FIG. 5.

FIG. 5 shows the modulation signal corrected by the modulator 41 in accordance with the first embodiment. In FIG. 5, the horizontal axis represents time t, while the vertical axis represents the injection current outputted by the amplifier 12 to the laser diode 10.

With respect to the waveform W3, because the period corrector 411 corrects the modulation period based on Formula 4, the modulation period T2 in the central area is shorter than the modulation periods T1 and T3 in the surrounding areas within the measuring range R1.

Further, in the waveform W3, because the amplitude corrector 412 corrects the modulation amplitude based on Formula 11, the amplitude increases with the passage of the time t (to such an extent as displacement from the origin position $X_0$ to the position $X_{2\psi}$).

The grating pattern, which is obtained when taking an image of the flat measuring object 3 while causing the laser diode 10 to emit light by the injection current in the waveform W3, has the same amplitude and the same intervals in both of the central and surrounding portions of the measuring area. For example, the imager 30 acquires a grating pattern or a stripe pattern with such an intensity distribution of the laser light as represented by a waveform W4 shown in FIG. 6.

Figure 6:
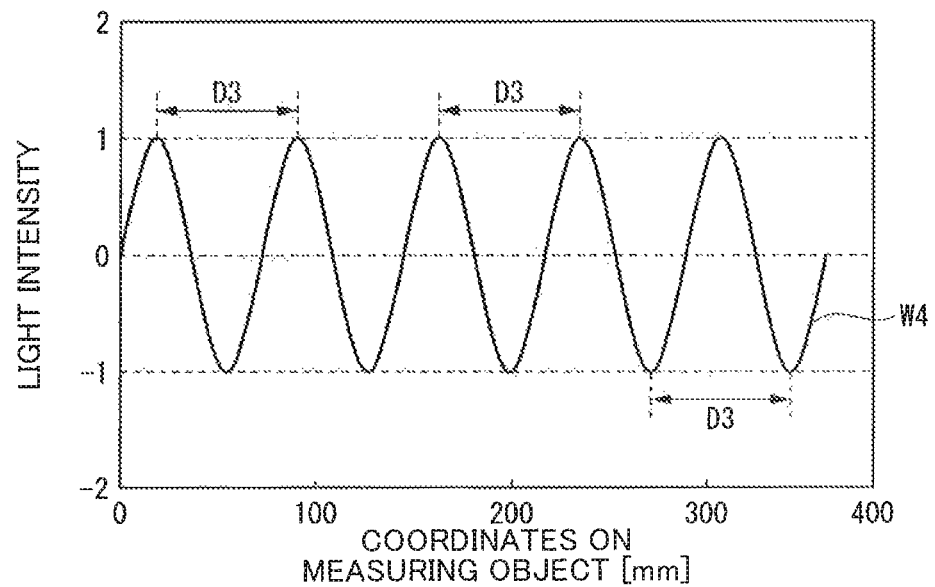
FIG. 6 shows an intensity distribution of light corrected by the modulator in accordance with the first embodiment.

Herein, the horizontal axis of FIG. 6 represents the coordinate x in FIG. 2, while the vertical axis represents the light intensity. This light intensity distribution corresponds to the bright-dark grating (striping) of the grating pattern (stripe pattern).

In this manner, in the form measuring apparatus 1 in accordance with the first embodiment, because the modulator 41 carries out the correction to alter the period and amplitude of modulation according to the directional change of the laser light by the aforementioned two methods, as shown by the waveform W4, there is obtained a grating pattern (stripe pattern) with uniform grating (striping) intervals and uniform grating (striping) intensity amplitude (see the intervals D3).

Further, when irradiating the laser light with a light intensity a little higher than the noise level of the area sensor 32, it is preferable to change the light irradiation intensity also for the darkest part according to the irradiation position of the measuring object 3. By virtue of this, it is possible to realize a higher-accuracy measurement.

Next, explanations will be given about an operation of the form measuring apparatus 1 to measure form of the measuring object 3.

Figure 7:
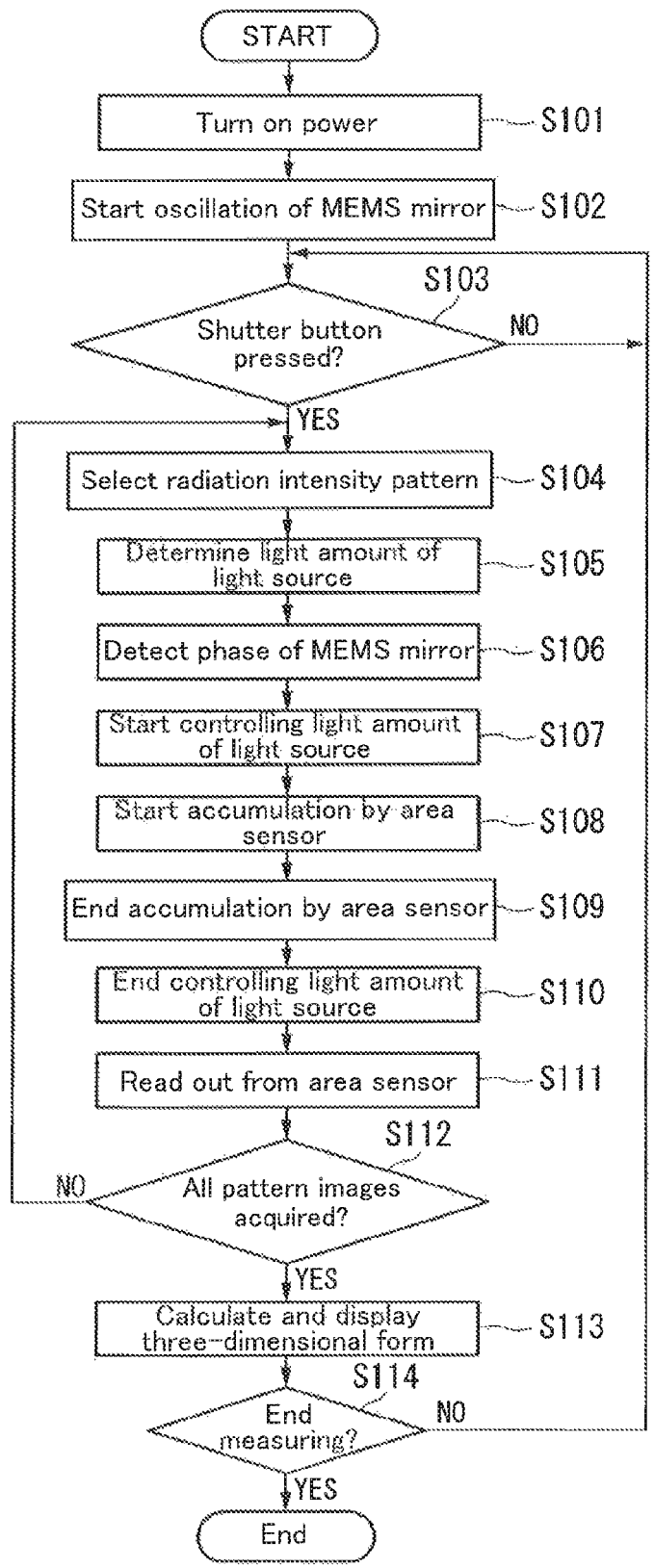
FIG. 7 is a flowchart showing a measuring process of the form measuring apparatus in accordance with the first embodiment.

FIG. 7 is a flowchart showing a measuring process of the form measuring apparatus 1 in accordance with the first embodiment.

In FIG. 7, first, when a user (operator) turns on the power to the form measuring apparatus 1 (step S101), then the controller 40 starts to oscillate the MEMS mirror 22 of the projector 20 (step S102).

Next, the controller 40 of the form measuring apparatus 1 determines whether or not the shutter button has been pressed to start the measuring operation (step S103). Further, the user situates the form measuring apparatus 1 to a predetermined measuring position for the measuring object 3 before pressing the shutter button. When determining that the shutter button has not yet been pressed, the controller 40 repeats the process of step S103.

In step S103, when it is determined that the shutter button has been pressed, then the controller 40 lets the process proceed to step S104 to select an irradiation intensity pattern. With the N-bucket method, it is configured to let a first irradiation intensity pattern be selected for the first time, and a second irradiation intensity pattern be selected for the second time. Next, in step S105, the controller 40 determines a light amount (corresponding to the light intensity) for the laser diode 10, which is the light source, according to the selected pattern.

Next, the form measuring apparatus 1 detects the phase information (angular information) of the MEMS mirror 22 (step S106). That is, the modulator 41 of the controller 40 acquires the angular information detected by the angle detector 50.

Next, the controller 40 starts to control the light amount of the laser diode 10 i.e. the light source (step S107). In particular, the period corrector 411 of the modulator 41 detects the point of time at which the phase information (angular information) of the MEMS mirror 22 becomes a predetermined value. Further, the period corrector 411 alters the modulation period based on the aforementioned Formula 4, in synchronization with the detected point of time. The amplitude corrector 412 alters the modulation amplitude based on Formula 11. Accordingly, the modulator 41 generates the corrected modulation signal. The corrected modulation signal is supplied to the laser diode 10 via the DAC 11 and amplifier 12.

Next, the controller 40 synchronizes the imager 30 with the operation of the projector 20, causes the area sensor 32 to start imaging, and starts a process of accumulating the image data obtained by the area sensor 32 (step S108).

Next, the controller 40 ends accumulating the image data by the area sensor 32 (step S109). That is, the controller 40 synchronizes the imager 30 with the operation of the projector 20, causes the area sensor 32 to end imaging, and ends the process of accumulating the image data obtained by the area sensor 32.

Next, the controller 40 ends controlling the light amount of the laser diode 10 i.e. the light source (step S110).

Next, the controller 40 causes the storage 60 to store the image data read out of the area sensor 32 (step S111). Further, the image data stored in the storage 60 are images of the grating pattern when the grating pattern is projected on the measuring object 3.

Next, the controller 40 determines whether or not there have been acquired images with all the projected patterns necessary for the form measurement (step S112). When the images have not yet been acquired, then the process returns to step S104 again to select the next projection pattern. On the other hand, when the images have been acquired with the necessary patterns projected, then the controller 40 calculates the three-dimensional form of the measuring object 3 based on the plurality of image data stored in the storage 60. The controller 40 lets the display 70 display the calculated three-dimensional form of the measuring object 3 (step S113).

Next, the form measuring apparatus 1 ends the process when the end of measuring is reached (step S114: YES), but returns the process to step S103 when the end of measuring is not reached (step S114: NO).

Further, in the first embodiment, the form measuring apparatus 1 calculates the three-dimensional form of the measuring object 3 based on the N-bucket method. Therefore, the form measuring apparatus 1 acquires, for example, a grating pattern image when projecting four grating patterns different in initial phrase on the measuring object 3. Then, the form measuring apparatus 1 calculates the three-dimensional form of the measuring object 3 based on the acquired image of the four grating patterns.

Figure 8:
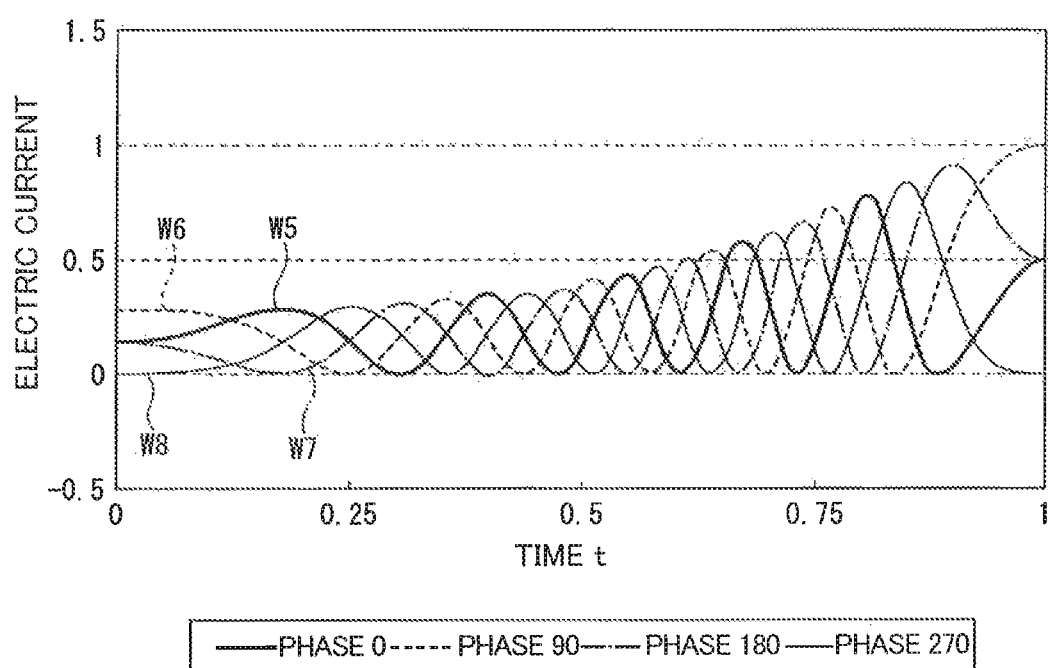
FIG. 8 shows four types of corrected modulation signals different in phase in accordance with the first embodiment.

Therefore, in order to project, onto the measuring object 3, the four grating patterns of which initial phrases are respectively 0 degree, 90 degree, 180 degree, and 270 degree, a modulation signal as shown in FIG. 8 is inputted as the drive signal to the laser diode 10. Further, FIG. 8 shows four types of corrected modulation signals different in phase in accordance with the first embodiment. In FIG. 8, the horizontal axis represents time t, while the vertical, axis represents the injection current outputted by the amplifier 12. Further, in FIG. 8, the waveform W5 represents the corrected modulation signal corresponding to the initial phase of 0 degree, while the waveform W6 represents the corrected modulation signal corresponding to the initial phase of 90 degree. Further, the waveform W7 represents the corrected modulation signal corresponding to the initial phase of 180 degree, while the waveform W8 represents the corrected modulation signal corresponding to the initial phase of 270 degree.

Then, the measuring portion 42 calculates the distance from the form measuring apparatus 1 to the surface of the measuring object 3 as the phase information θ according to each pixel constituting the image data, from the image data of the four grating patterns acquired from the imager 30, by such a formula of the process method as shown in the following Formula 12.

⟨Formula 12⟩

$$\theta = \tan^{-1} \frac{I_{90} - I_{270}}{I_{180} - I_0} \quad (12)$$

Here in Formula 12, $I_0$, $I_{90}$, $I_{180}$, and $I_{270}$ are the intensities of the respective pixels detected by the area sensor 32 when projecting, onto the measuring object 3, the sinusoidal stripes of which initial phases are respectively 0 degree, 90 degree, 180 degree, and 270 degree.

The measuring portion 42 calculates the form of the measuring object 3 based on the phase information θ calculated by using Formula 12.

As explained above, in the form measuring apparatus 1 in accordance with the first embodiment, the laser diode 10 is synchronized when the irradiation direction of the light from the projector 20 becomes a predetermined direction, and irradiates the measuring object 3 with the light while changing the intensity with a certain period and certain amplitude. The projector 20 periodically changes the irradiation direction of the light emitted from the laser diode 10. On the other hand, the imager 30 performs exposure to carry out imaging over the period of scanning at least the measuring area of the measuring object 3 with the light from the laser diode 10. By virtue of this, the imager 30 takes an image of the grating pattern projected on the measuring object 3. The measuring portion 42 measures the form of the measuring object 3 based on the image taken by the imager 30.

By virtue of this, because the light intensity is altered by changing the modulation period and modulation amplitude according to the directional change of the light from the projector 20, it is possible to correct the unevenness of the pitch and brightness of the grating pattern being projected on the measuring object 3, arising from the directional change of the irradiating light. Therefore, even when the measuring area is set to have a wider range than the distance from the form measuring apparatus 1 to the measuring object 3, it is still possible to project, onto the flat measuring object 3, the image of the grating pattern with a predetermined pitch and a predetermined brightness over the entire measuring area. Therefore, the form measuring apparatus 1 in the first embodiment can maintain the same measuring accuracy independent of the measuring position, while widening the range of measuring the measuring object 3.

Further, because the form measuring apparatus 1 in the first embodiment can collectively measure an object over a wide range, it is possible to reduce the measuring time.

Further, in the first embodiment, the imager 30 includes an imaging optical system (the light receiving lens 31) which forms an image of the pattern, and the modulator 41 (the period corrector 411) can alter the modulation period according to the imaging performance of the imaging optical system. For example, suppose that the measuring object 3 is a flat surface vertical to the optical axis of the light receiving lens 31 as shown in FIG. 2 at the center and periphery of the visual field of the imager 30, and that the grating pattern is projected with the same pitch and the same intensity change at both of the center and periphery of the visual field. Even in such a case, the image obtained by the imager 30 can still be subjected to grating pitch change at the center and periphery of the image, due to some distortion of the light receiving lens 31. Therefore, for the area showing narrow pitches of the grating pattern projected at equal intervals, it is recommendable to alter the modulation period of the drive signal supplied to the laser diode 10 according to the angular velocity of the MEMS mirror 22 and the distortion feature of the light receiving lens 31 at the time of irradiating the relevant area with the laser light, so as to project the grating pattern with a wider pitch. Especially, when the imager 30 adopts a fisheye lens as the light receiving lens 31, etc., then the modulator 41 (the period corrector 411) lengthens the modulation period for the surrounding part of the measuring range so as to form the grating intervals (stripe intervals) measurable by the F value of the light receiving lens 31.

By virtue of this, because it is possible to form a suitable grating pattern (stripe pattern) according to the imaging performance of the imaging optical system, the form measuring apparatus 1 in the first embodiment can prevent the grating intervals (stripe intervals) from growing narrow in the surrounding area, thereby making it possible to widen the measuring range of measuring the measuring object 3.

Further, in the first embodiment, the modulator 41 (the amplitude corrector 412) alters the modulation amplitude according to the directional change of the irradiating light.

However, the present teaching is not limited to only altering the modulation amplitude. For example, when a C-MOS-type area sensor is used, then the gain in the corresponding pixel can also be variable according to the set modulation amplitude.

Further, in the first embodiment, for example, when the measuring object 3 is a flat surface of uniform reflectivity and diffusivity, then the modulator 41 (the amplitude corrector 412) carries out modulation on the drive signal to the laser diode 10 so as to form a constant intensity difference between the bright part and the dark part of the image of the grating pattern projected on the measuring object 3. Further, the modulator 41 (the amplitude corrector 412) can also alter the modulation to the drive signal of the laser diode 10 according to the directional change of the light such that the grating (striping) intensity distribution in the grating pattern (stripe pattern) is within the scope of the level at which the area sensor 32 is capable of imaging based on the noise level and saturation level of the area sensor 32 (imaging element) included in the imager 30.

By virtue of this, because it is possible to constrain the dynamic range of the projecting grating pattern, the form measuring apparatus 1 in the first embodiment can widen the measuring range of measuring the measuring object 3.

Further, in the first embodiment, the following alternative method is also adoptable other than modulating the drive signal to the laser diode 10 to cause a light amount change to the measuring object 3. That is, in the projector, there can be arranged a mirror capable of varying the reflectivity, and a filter or liquid crystal panel capable of varying the light amount between the light source and the measuring object 3, so as to cause the reflectivity and transmissivity to be variable according to the irradiation direction of the MEMS mirror 22. By doing so, it is possible to impart a desirable brightness distribution to the grating pattern projected on the measuring object 3.

Further, in the first embodiment, the modulator 41 detects the directional change of the light as the timing information which indicates a predetermined direction (the oscillating origin position $X_0$, for example) in the scope of change in the light direction changed by the projector 20, and alters the modulation based on this timing information.

In this case, when it is possible to detect only the predetermined direction within the scope of change in the light direction changed by the projector 20, then the modulator 41 can alter the modulation; thus the modulation process can be realized by a simple mechanism.

Further, the form measuring apparatus 1 in the first embodiment includes the storage 60 which stores the precalculated correction information 61 (lookup table, for example) associated with the directional change of the light (for example, the elapsed time t based on the angular information, and the timing information indicating a predetermined direction). The modulator 41 alters the modulation based on the correction information 61 stored in the storage 60 and associated with the directional change of the light.

By virtue of this, because the correction information 61 is precalculated with Formula 4 and Formula 11, and prestored in the storage 60, it is possible to reduce the calculation amount of the modulator 41 in the process of altering the modulation.

Further, in the first embodiment, the modulator 41 carries out the modulation such that the imager 30 takes images in which a plurality of (four, for example) grating patterns (stripe patterns) different in initial phase are projected on the measuring object 3. The imager 30 takes the images of the plurality of grating patterns different in initial phase, respectively. The measuring portion 42 measures the form of the measuring object 3 based on the plurality of the images which are taken by the imager 30 and correspond respectively to the plurality of grating patterns (stripe patterns) different in phase.

By virtue of this, the form measuring apparatus 1 in the first embodiment can, for example, widen the measuring range of measuring the measuring object 3 while correctly measuring the form of the measuring object 3 by using the N-bucket method.

Further, in the first embodiment, while the controller 40 includes the amplitude corrector 412 and period corrector 411 as the modulator 41, it is also possible to only include either one corrector of the amplitude corrector 412 and period corrector 411. By virtue of this, it is possible to simplify the control by reducing the number of objects controlled by the controller 40 and, furthermore, it is possible to reduce the power consumption of the form measuring apparatus 1.

Further, the first embodiment applies a form measuring method which includes an irradiation step of irradiating light, a projection step, a modulation step, an imaging step, and a measuring step. The projection step is configured to project a pattern via light onto the measuring object 3 by periodically changing the direction of the light radiated in the irradiation step. The modulation step is configured to carry out a modulation to periodically change the light intensity radiated in the irradiation step, while altering the modulation according to the directional change of the light. The imaging step is configured to take an image of the pattern projected on the measuring object 3 in the projection step. The measuring step is configured to measure the form of the measuring object 3 based on the image taken in the imaging step.

By virtue of this, because of altering the modulation to periodically change the light intensity according to the directional change of the light in the projection step, it is possible to correct the change in the image of the pattern projected on the measuring object 3, arising from the directional change of the irradiating light. Therefore, it is possible to obtain suitable pattern images independent of the directional change of the irradiating light. Accordingly, it is possible to widen the measuring range of measuring the measuring object 3 by using the form measuring method in the first embodiment.

Second Embodiment

Next, explanations will be given about a structural object manufacturing system provided with the form measuring apparatus 1 described hereinabove.

Figure 9:
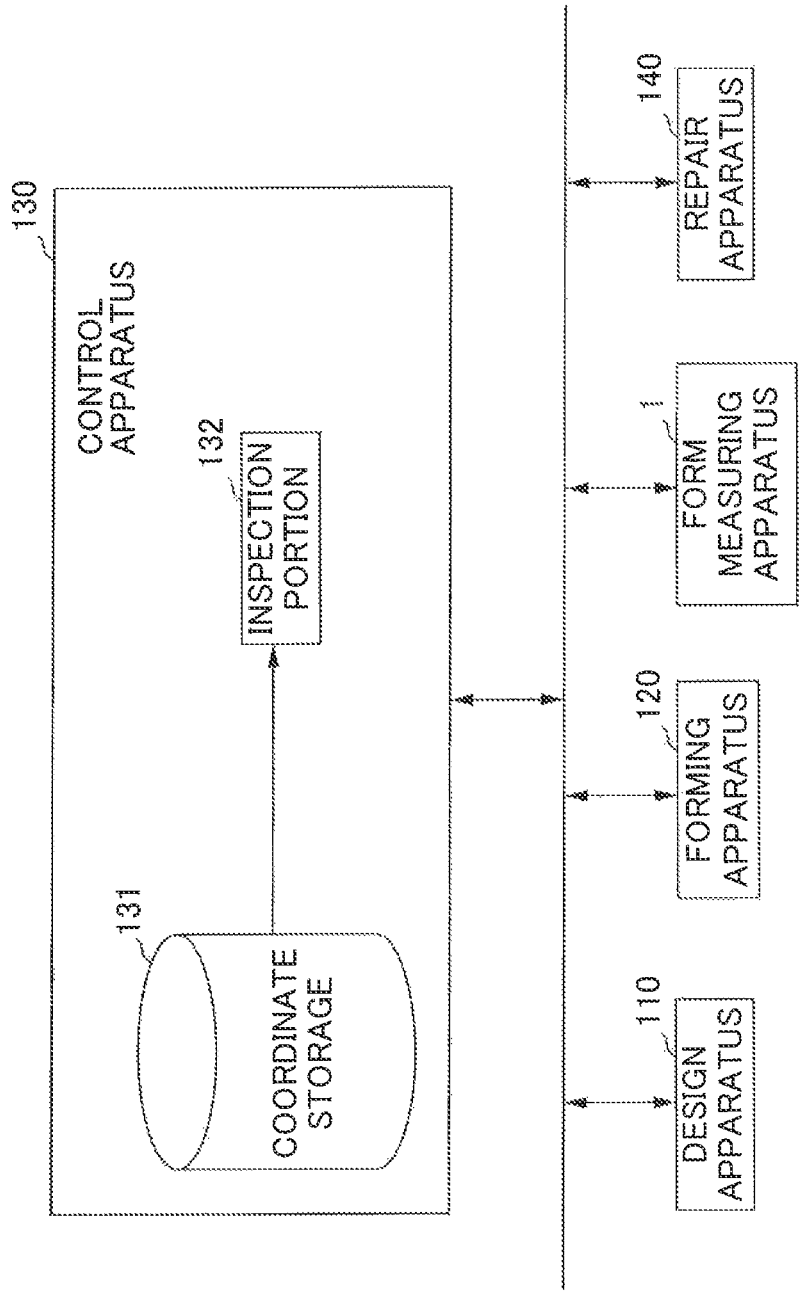
FIG. 9 is a schematic block diagram showing a construction of a structural object producing system in accordance with a second embodiment.

FIG. 9 is a block diagram of construction of a structural object manufacturing system 200. The structural object manufacturing system 200 includes the aforementioned form measuring apparatus 1, a design apparatus 110, a forming apparatus 120, a controller (inspection apparatus) 130, and a repair apparatus 140.

The design apparatus 110 creates design information related to the form of a structural object, and sends the created design information to the forming apparatus 120. Further, the design apparatus 110 stores the created design information into an aftermentioned coordinate storage 131 of the control device 130. The design information mentioned here indicates the coordinates of each position of the structural object. Further, the aforementioned measuring object 3 corresponds to the structural object in the second embodiment.

Based on the design information inputted from the design apparatus 110, the forming apparatus 120 fabricates the above structural object. The formation process of the forming apparatus 120 includes casting, forging, cutting, and the like.

The form measuring apparatus 1 measures the coordinates of the fabricated structural object (the measuring object), and sends information (form information) indicating the measured coordinates to the controller 130.

The controller 130 includes the coordinate storage 131 and an inspection portion 132. The coordinate storage 131 stores the design information from the design apparatus 110 as described hereinbefore. The inspection portion 132 reads out the design information from the coordinate storage 131. The inspection portion 132 compares the information (the form information) indicating the coordinates received from the form measuring apparatus 1 with the design information read out of the coordinate storage 131.

Based on the comparison result, the inspection portion 132 determines whether or not the structural object is formed in accordance with the design information. In other words, the inspection portion 132 determines whether or not the fabricated structural object is nondefective. When the structural object is not formed in accordance with the design information, then the inspection portion 132 determines whether or not it is repairable. When it is repairable, then the inspection portion 132 calculates the defective portions and repairing amount based on the comparison result, and sends information to the repair device 140 to indicate the defective portions and the repairing amount.

Based on the information indicating the defective portions and repairing amount received from the controller 130, the repair apparatus 140 processes the defective portions of the structural object.

Figure 10:
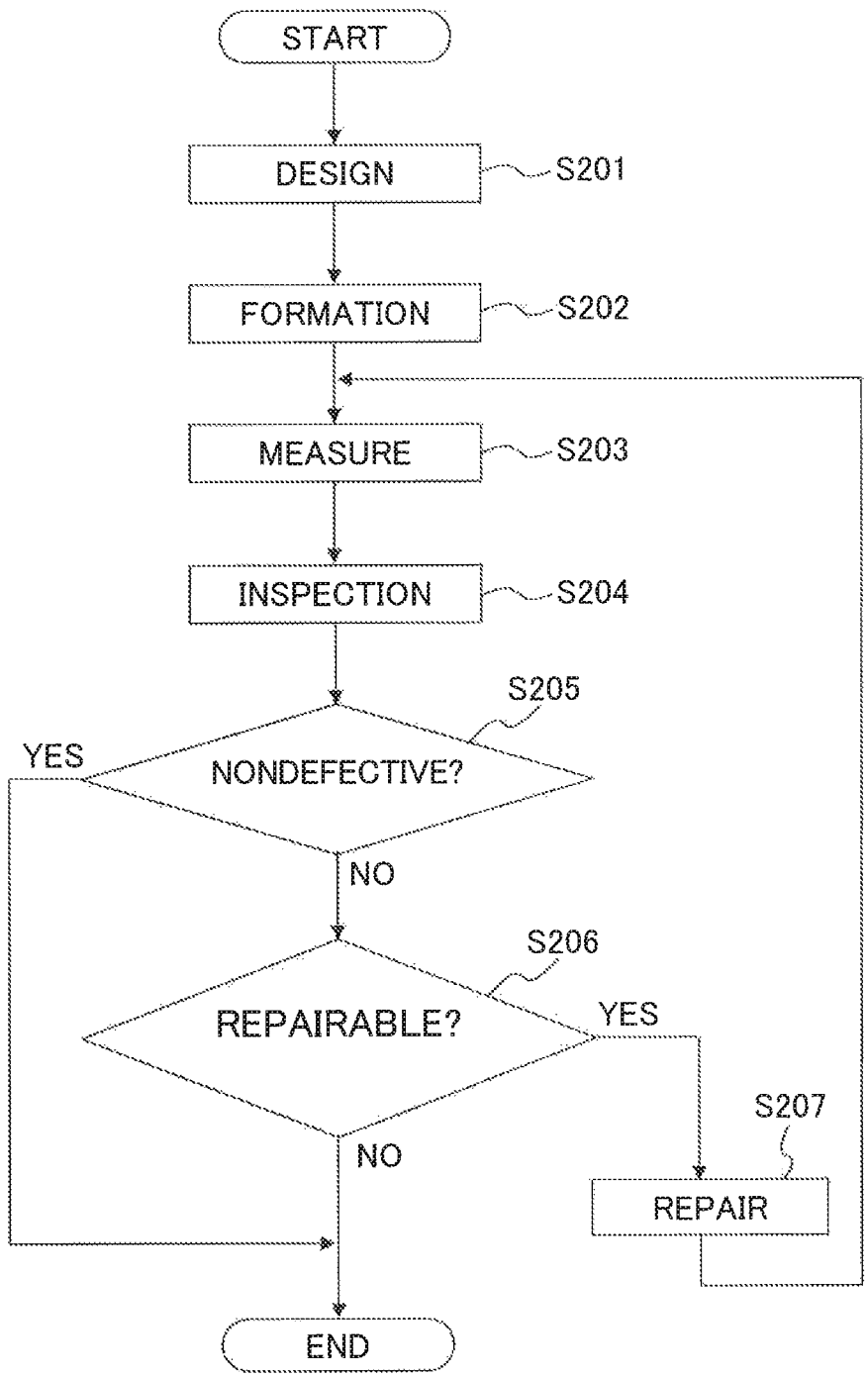
FIG. 10 is a flowchart showing a process flow by the structural object producing system in accordance with the second embodiment.

FIG. 10 is a flowchart showing a process flow of the structural object manufacturing system 200. First, the design apparatus 110 creates design information related to the form of a structural object (step S201). Next, the forming apparatus 120 fabricates the above structural object based on the design information (step S202). Then, the form measuring apparatus 1 measures the form of the fabricated structural object (step S203). Thereafter, the inspection portion 132 of the controller 130 inspects whether or not the structural object is really fabricated in accordance with the design information by comparing the form information obtained by the form measuring apparatus 1 with the above design information (step S204).

Next, the inspection portion 132 of the controller 130 determines whether or not the fabricated structural object is nondefective (step S205). When the fabricated structural object is nondefective (step S205: Yes), then the structural object manufacturing system 200 ends the process. On the other hand, when the fabricated structural object is defective (step S205: No), then the inspection portion 132 of the controller 130 determines whether or not the fabricated structural object is repairable (step S206).

When the fabricated structural object is repairable (step S206: Yes), then the repair apparatus 140 reprocesses the structural object (step S207), and then the process returns to step S203. On the other hand, when the fabricated structural object is not repairable (step S206: No), then the structural object manufacturing system 200 ends the process. With that, the process of the flowchart is ended.

In the above manner, because the form measuring apparatus 1 in the aforementioned first embodiment can widen the measuring range of measuring the structural object, the structural object manufacturing system 200 can reduce the time for determining whether or not the fabricated structural object is nondefective. Further, because the form measuring apparatus 1 in the first embodiment can correctly measure the coordinates of the structural object, the structural object manufacturing system 200 can determine whether or not the fabricated structural object is nondefective. Further, when the structural object is defective, then the structural object manufacturing system 200 can reprocess the structural object to repair the same.

Further, the repair process carried out by the repair apparatus 140 in the second embodiment can alternatively be replaced by a process for the forming apparatus 120 to carry out the formation process over again. On this occasion, when the inspection portion 132 of the controller 130 determines that it is repairable, then the forming apparatus 120 carries out the formation process (forging, cutting and the like) over again. In particular, for example, the forming apparatus 120 cuts the portions of the structural object which should have been cut but have not. By virtue of this, the structural object producing system 200 can correctly fabricate the structural object.

Further, the present teaching is not limited to any of the respective embodiments above, but is alterable without departing from the scope and true spirit of the present teaching.

For example, in the respective embodiments above, while the explanation is made with an aspect of using the laser diode 10 irradiating visible laser light as the light source, i.e., the irradiator, the present teaching is not limited to this. For example, instead of the laser diode 10, as another aspect it is also possible to use an X-ray source, terahertz light source, visible-light LED (Light Emitting Diode), infrared LED, infrared semiconductor laser, etc., or to use a irradiator which irradiates another electromagnetic wave.

Further, in the respective embodiments above, while the explanation is made with an aspect of using the MEMS mirror 22 in the projector 20, the present teaching is not limited to this. For example, as another aspect it is also possible to use, in the projector 20, a galvanic mirror, polygon mirror, DMD (Digital Micromirror Device), plate spring fitted with a mirror, etc. Further, as still another aspect it is also possible to use, in the projector 20, a member which makes use of diffraction phenomenon such as AOM (Acousto-Optic Modulator), etc., or to use another deflection member which deflects light.

Further, in the respective embodiments above, while the explanation is made with an aspect of using the area sensor 32 as an imaging element, the present teaching is not limited to this. For example, as another aspect it is also possible to use a CCD-type image sensor, MOS-type image sensor, MOS-type area sensor, etc.

Further, the angle detector 50 is not limited to the respective embodiments above. As another aspect, the angle detector 50 can also use, for example, a photodiode, photo interrupter, phototransistor, rotary encoder, etc.

Further, in the respective embodiments above, the explanation is made with an aspect of using lenses such as the light receiving lens 31 and the like as the configuration of forming the pattern image. However, as another aspect, it is also possible to use, for example, mirrors, zone plates, etc.

Further, in the respective embodiments above, the explanation is made with an aspect that the form measuring apparatus 1 uses light to measure the form of the measuring object 3. However, the present teaching is not limited to this, but is applicable to various electromagnetic waves. For example, when X-ray is used for the form measuring apparatus 1, then the form measuring apparatus 1 is configured to use a mirror coated for use of X-ray instead of the MEMS mirror 22, and to use a focusing mirror or zone plate for use of X-ray instead of a lens such as the light receiving lens 31 or the like. Further, in such case, instead of the area sensor 32, an area sensor for use of X-ray is used.

In the above manner, the form measuring apparatus 1 includes an irradiator irradiating an electromagnetic wave (the laser diode 10), a projector (the projector 20), a detector (the imager 30), a measuring portion (the measuring portion 42), and a modulator (the modulator 41). The projector periodically changes the direction of the electromagnetic wave irradiated from the irradiator, and projects, onto a measuring object, a pattern of energy density distribution formed by the electromagnetic wave. The detector detects an image of the pattern of energy density distribution projected by the projector on the measuring object. The measuring portion measures the form of the measuring object based on the image detected by the detector. Then, the modulator carries out modulation which periodically changes the energy density of the electromagnetic wave radiated from the irradiation portion, while altering the modulation according to the directional change of the electromagnetic wave.

By virtue of this, because the form measuring apparatus 1 alters the modulation which periodically changes the energy density of the electromagnetic wave according to the directional change of the electromagnetic wave by the projector, it is possible to correct the change of the image projected on the measuring object, arising from the directional change of the irradiating electromagnetic wave. Therefore, because it is possible to obtain an image of the pattern of a suitable energy density distribution independent of the directional change of the irradiating electromagnetic wave, the form measuring apparatus 1 in the above embodiments can widen the measuring range of measuring the measuring object.

Further, in the respective embodiments above, the explanation is made with an aspect of using the cylindrical lens 24 to generate approximately rectangular shaped pattern light (linear light). However, as another aspect, it is also possible to generate approximately rectangular shaped pattern light (linear light) by scanning with spot light.

Further, as still another aspect, it is also possible to arrange a Powell lens between the cylindrical lens 24 and the condensing lens 233 as in FIG. 2. In such case, it is possible to obtain an even intensity distribution in the approximately rectangular shaped pattern light. Therefore, it is possible for the form measuring apparatus 1 to improve a spatial uniformity of the intensity in the grating (striping) within the scope of the image taken by the imager 30. Thus, the form measuring apparatus 1 can reduce the possibility of failing to measure the object because of being unable to acquire the signal for some end portion of the grating (striping).

Further, in the respective embodiments above, while the explanation is made with an aspect that the modulator 41 includes both of the period corrector 411 and the amplitude corrector 412, as another aspect the modulator 41 can include either one of them.

Further, in the respective embodiments above, the explanation is made with an aspect that the modulator 41 alters the modulation based on the correction information 61 (lookup table) precalculated with Formula 4 and Formula 11. However, as another aspect, it is also possible to carry out the calculation with Formula 4 and Formula 11 each time to alter the modulation.

Further, in the respective embodiments above, the explanation is made with an aspect of altering the modulation based on Formula 4 and Formula 11. However, the present teaching is not limited to this. As another aspect, it is also possible to alter the modulation based on other correction functions.

Further, in the respective embodiments above, the explanation is made with an aspect that, as an example, the measuring portion 42 uses Formula 12 based on the N-bucket method to measure the form of the measuring object 3. However, the present teaching is not limited to this. As another aspect, it is also possible to use other methods. Further, while the explanation is made with an aspect of using an image of four grating patterns (stripe patterns) different in initial phase, the present teaching is not limited to this, either.

Further, "controller CONT" will be used hereinbelow as an inclusive term to include the form measuring apparatus 1, controller 130, forming apparatus 120, repair apparatus 140 and design apparatus 110 in either of the embodiments above. This controller CONT or each part included in this controller CONT can be realized either by dedicated hardware or by a microprocessor and memory.

Further, the controller CONT or each part included in the controller CONT can be realized by dedicated hardware. The controller CONT or each part included in the controller CONT can be constructed of a CPU (Central Processing Unit) and memory while its function is realized by loading a program into the memory and executing the program for realizing the function of the controller CONT or each part included in the controller CONT.

Further, it is possible to carry out the process of the controller CONT or each part included in the controller CONT by recording a program for realizing the function of the controller CONT or each part included in the controller CONT into a computer-readable recording medium, letting a computer system read in the program stored in the recording medium, and executing the program. Further, the term "computer system" used here is supposed to include an OS (Operating System), and hardware such as peripheral equipment and the like.

Further, the "computer system" is supposed to also include a WWW (World Wide Web) system provided with a website provision environment (or a display environment). Further, the "computer-readable recording medium" refers to a portable medium such as a flexible disk, magnetic optical disk, ROM, CD-ROM, etc., or a storage device such as hard disk built in the computer system, etc. Further, the "computer-readable recording medium" is supposed to also include devices which retain a program for a certain period of time such as volatile memory (RAM) inside the computer system which acts as a server or a client on the occasion of transmitting the program via a network such as the Internet or the like, or via communication lines such as telephone lines or the like.

Further, the abovementioned program can also be transmitted to other computer systems from the computer system storing the program in its storage device or the like via a transmission medium, or by some transmission wave in the transmission medium. Here, the term "transmission medium" transmitting the program refers to a medium which has such a function of transmitting information as a (communication) network such as the Internet or the like, or communication links (lines) such as telephone lines or the like. Alternatively, the abovementioned program can serve the purpose of realizing part of the aforementioned function. Still alternatively, it can be a so-called difference file (difference program) which enables the realization of the aforementioned function by combination with the program already recorded in the computer system.

What is claimed is:

1. An apparatus for determining a three-dimensional form of an object comprising:
a light generator configured to generate a light;
a projector configured to scan the object with the light by changing an irradiation direction of the light;
a controller configured to control the light generator to periodically change an intensity of the light, and to change an amplitude of the intensity change of the light according to the irradiation direction;
an imager configured to take an image of the object; and
a measuring portion configured to determine the three-dimensional form of the object based on the image of the object.

2. The apparatus according to claim 1, wherein
the image is formed at a light-receiving plane;
the imager includes an imaging element configured to take the image; and
under a condition that the object is a flat surface conjugate to the light-receiving plane, the controller is configured to control the light generator to change the amplitude of the intensity change of the light according to a direction of scanning of the light by the projector, so as to acquire a grating pattern with equal difference in light intensity between a bright part and a dark part of the image taken by the imaging element through exposure over a predetermined period of time.

3. Apparatus according to claim 1, wherein
the imager includes an imaging element, and an imaging optical system which is configured to form the image on the imaging element; and
the controller is configured to control the light generator to change the amplitude of the intensity change of the light according to optical conditions of the imaging optical system.

4. The apparatus according to claim 1, wherein
the controller is configured to generate a control signal which is supplied to the light generator to modulate the intensity of the light in proportion to the intensity of the control signal, and
the controller is further configured to change an amplitude of the control signal supplied to the light generator according to the irradiation direction.

5. The apparatus according to claim 1, wherein the controller is configured to control the light generator to change a period of the intensity change of the light according to the irradiation direction.

6. The apparatus according to claim 5, wherein the controller is configured to control the light generator to change the period of the intensity change of the light based on an elapsed time from a first point of time at which the projector deflected the irradiation direction of the light toward the object to a predetermined direction.

7. The apparatus according to claim 5, wherein:
the imager includes an imaging element, and an imaging optical system which is configured to form the image on the imaging element; and
the controller is configured to control the light generator to change the period of the intensity change of the light according to optical conditions of the imaging optical system.

8. The apparatus according to claim 5, wherein the controller is configured to control the light generator to change the period of the intensity change of the light, so as to lengthen the period of the intensity change of the light according to the direction of scanning the object in an end area rather than a central area on the object of which image is taken by the imager.

9. The apparatus according to claim 5, wherein
the image is formed on a light-receiving plane;
the imager includes an imaging element which is configured to take the image; and
under a condition that the object is a flat surface conjugate to the light-receiving plane, the controller is configured to control the light generator to change the period of the intensity change of the light according to a direction of scanning with the light by the projector, so as to acquire a grating pattern with equal difference in light intensity between a bright part and a dark part of the image taken by the imager through exposure over a predetermined period of time.

10. The apparatus according to claim 5, wherein the controller is configured to control the light generator to change the period of the intensity change of the light in inverse proportion to the distance between the projector and the area irradiated with the light on the object.

11. The apparatus according to claim 5, wherein
the controller is configured to generate a control signal which is supplied to the light generator to modulate the intensity of the light in proportion to the intensity of the control signal, and
the controller is further configured to change a period of the control signal supplied to the light generator according to the irradiation direction.

12. The apparatus according to claim 1, wherein the projector includes a deflector configured to change the irradiation direction of the light toward the object with a constant period.

13. The apparatus according to claim 12, wherein the deflector is a reflecting member of a simple harmonic motion type.

14. The apparatus according to claim 1, wherein an exposure time of the imager is setup synchronized with the projector.

15. The apparatus according to claim 1, further comprising a detector which is configured to detect the irradiation direction of the light toward the object,
wherein the controller is configured to control the light generator based on the irradiation direction.

16. The apparatus according to claim 15:
wherein the detector is configured to detect a signal indicating that the irradiation direction of the light is a predetermined direction; and
the controller is configured to control the light generator based on the signal detected by the detector, so that the intensity of the light is synchronized with the irradiation direction of the light from the projector.

17. The apparatus according to claim 1, further comprising a storage configured to store information related to the intensity of the light in association with the irradiation direction of the light toward the object,
wherein the controller is configured to control the light generator based on the information stored in the storage.

18. The apparatus according to claim 1, wherein the light generator is configured to generate the light of which intensity changes sinusoidally.

19. The apparatus according to claim 1, wherein:
the projector is configured to form a light amount distribution in a shape of a grating pattern on the object by scanning with the light over the object; and the controller is configured to control the intensity of the light to change an initial phase of the grating pattern formed on the object.

20. A structure manufacturing system comprising:
a design apparatus configured to create design information related to a form of a structure;
a forming apparatus configured to form the structure based on the design information;
an apparatus for determining a three-dimensional form of the structure comprising:
a light generator configured to generate a light;
a projector configured to scan the structure with the light by changing an irradiation direction of the light;
a controller configured to control the ht generator to periodically change an intensity of the light and to change an amplitude of the intensity change of the light according to the irradiation direction;
an imager configured to take an image of the structure; and
a measuring portion configured to determine the three-dimensional form of the structure based on the image; and
an inspection device configured to compare the determined three-dimensional form of the structure with the design information.

21. An apparatus for determining a three-dimensional form of an object, comprising:
a light generator configured to generate a light;
a projector configured to scan the object with the light by changing an irradiation direction of the light;
a controller configured to control the light generator to sinusoidally change intensity of the light, and to change a period of the intensity change of the light according to the irradiation direction;
an imager configured to take an image of the object; and
a measuring portion configured to determine the three-dimensional form of the object based on the image.

22. A scanner comprising:
a light generator configured to generate a light;
a projector configured to scan an object with the light by changing an irradiation direction of the light; and
a controller configured to control the light generator to change an amplitude of an intensity change of the light according to the irradiation direction.

23. The scanner according to claim 22, wherein the controller is configured to control the light generator to change a period of the intensity change of the light according to the irradiation direction.

24. A method for determining a three-dimensional form of an object comprising:
generating a light;
scanning the object with the light by changing an irradiation direction of the light;
modulating an intensity of the light periodically, and modulating an amplitude of an intensity change of the light according to the irradiation direction;
taking an image of the object in synchronization with scanning the object with the light; and
determining the three-dimensional form of the object based on the image.

25. The method according to claim 24, wherein upon modulating the amplitude of the intensity change of the light, the amplitude of the intensity of the light is modulated, so as to acquire a grating pattern with equal difference in light intensity between a bright part and a dark part of the image, taken by the imaging element, of the object, under a condition that the object is a flat surface conjugate to a light-receiving plane of an imaging element which takes the image of the object.

26. The method according to claim 24, wherein upon modulating the amplitude of the intensity change of the light, the amplitude of the intensity of the light is modulated based on properties of an optical system which is configured to cause an imaging element to form the image.

27. The method according to claim 24, wherein upon modulating the amplitude of the intensity change of the light, a control signal is generated to modulate the intensity of the light in proportion to the intensity of the control signal, and an amplitude of the intensity change of the control signal is modulated according to the irradiation direction.

28. The method according to claim 24, further comprising:
modulating a period of the intensity change of the light according to the irradiation direction.

29. The method according to claim 28, wherein modulating the period of the intensity change of the light, the period of the intensity change is modulated based on an elapsed time from a first point of time of deflecting the irradiation direction of the light toward the object to a predetermined direction.

30. The method according to claim 29, wherein an exposure time for taking the image is setup synchronized with scanning the object with the light.

31. The method according to claim 28, wherein upon modulating the period of the intensity change of the light, the period of the intensity change of the light is modulated based on properties of an optical system which is configured to cause an imaging element to form the image.

32. The method according to claim 28, wherein upon modulating the period of the intensity change of the light, the period of the intensity change of the light is lengthened in an end area rather than a central area of taking the image.

33. The method according to claim 28, wherein upon modulating the period of the intensity change of the light, the period of the intensity change of the light is modulated, so as to acquire a grating pattern with equal difference in light intensity between a bright part and a dark part of the image, under a condition that the object is a flat surface conjugate to a light-receiving plane of an imaging element which is configured to take the image.

34. The method according to claim 28, wherein upon modulating the period of the intensity change of the light, the period of the intensity change of the light is modulated in inverse proportion to the distance between a projector which is configured to change an irradiation direction of the light toward the object, and a positron irradiated with the light on the object.

35. The method according to claim 28, wherein upon modulating the period of the intensity change of the light, a control signal is generated to modulate the intensity of the light in proportion to the intensity of the control signal, and the period of the intensity change of the control signal is modulated according to the irradiation direction.

36. The method according to claim 24, further comprising:
detecting a change in irradiation direction of the light toward the object,
wherein upon modulating the period of the intensity change of the light, the period of the intensity change of the light is modulated based on the detected irradiation direction.

37. The method according to claim 36, wherein upon detecting the changing irradiation direction of the light toward the object, a signal indicating that the change in irradiation direction of the light is a predetermined direction is detected; and upon modulating the period of the intensity change of the light, the intensity change is modulated based on the detected signal, so as to synchronize the irradiation direction of the light with the intensity of the light.

38. The method according to claim 24, further comprising:
storing information related to the intensity of the light in association with the changing irradiation direction of the light toward the object,
wherein upon modulating the period of the intensity change of the light, the intensity change is modulated based on the stored information.

39. The method according to claim 24, wherein upon scanning the object with the light, the object is scanned with the light to form a light amount distribution in a shape of a grating pattern on the object; and
upon modulating the period of the intensity change of the light, the intensity of the light is modulated to change an initial phase of the grating pattern formed on the object.

40. A structure manufacturing method comprising:
creating design information related to a form of a structure;
manufacturing the structure based on the design information;
generating a light;
scanning the structure with the light by changing an irradiation direction of the light;
modulating an intensity of the light periodically, and modulating an amplitude of an intensity change of the light according to the irradiation direction;
taking an image of the structure in synchronization with scanning the structure with the light;
determining a three-dimensional form of the structure based on the image; and
comparing the three-dimensional form with the design information.

41. The method according to claim 40, further comprising:
carrying out reprocessing of the structure based on a result of comparing the three-dimensional form with the design information.

42. The method according to claim 41, wherein upon carrying out the reprocessing, manufacturing the structure is carried out over again.

43. A non-transitory computer-readable medium storing a program configured to cause a computer within an apparatus to carry out operations comprising:
generating light, via a light generator of the apparatus;
scanning an object with the light by changing irradiation direction of the light, via a projector of the apparatus;
controlling the light generator, via a controller of the apparatus, to periodically modulate an intensity of the light, and to modulate an amplitude of the intensity change of the light according to the irradiation direction;
taking an image of the object scanned via the projector with the light, via an imager of the apparatus; and
determining a three-dimensional form of the object based on the image via a measuring portion of the apparatus.

44. The computer-readable medium according to claim 43, wherein upon controlling the light generator via the controller, the controller controls the light generator to modulate a period of the intensity change of the light, according to the irradiation direction.

* * * * *

UNITED STATES PATENT AND TRADEMARK OFFICE
CERTIFICATE OF CORRECTION

PATENT NO. : 9,146,096 B2  
APPLICATION NO. : 13/785527  
DATED : September 29, 2015  
INVENTOR(S) : Akira Takahashi Page 1 of 1

It is certified that error appears in the above-identified patent and that said Letters Patent is hereby corrected as shown below:

IN THE CLAIMS

Claim 20, column 25, line 14, "ht" should read as --light--.

Signed and Sealed this  
Twenty-second Day of March, 2016

Michelle K. Lee  
*Director of the United States Patent and Trademark Office*